(12) United States Patent
Zhang et al.

(10) Patent No.: US 8,194,927 B2
(45) Date of Patent: Jun. 5, 2012

(54) ROAD-LANE MARKER DETECTION USING LIGHT-BASED SENSING TECHNOLOGY

(75) Inventors: Wende Zhang, Shelby Township, MI (US); Varsha Sadekar, Sterling Heights, MI (US); Christopher Paul Urmson, Pittsburgh, PA (US)

(73) Assignee: GM Global Technology Operations LLC, Detroit, MI (US)

( * ) Notice: Subject to any disclaimer, the term of this patent is extended or adjusted under 35 U.S.C. 154(b) by 991 days.

(21) Appl. No.: 12/175,622

(22) Filed: Jul. 18, 2008

(65) Prior Publication Data

US 2010/0014713 A1 Jan. 21, 2010

(51) Int. Cl.
*G06K 9/00* (2006.01)
(52) U.S. Cl. ....................................................... 382/104
(58) Field of Classification Search .......................... None
See application file for complete search history.

(56) References Cited

U.S. PATENT DOCUMENTS

| | | | |
|---|---|---|---|
| 5,675,489 A | 10/1997 | Pomerleau | |
| 6,819,779 B1 * | 11/2004 | Nichani | 382/104 |
| 7,151,996 B2 | 12/2006 | Stein | |
| 7,876,926 B2 * | 1/2011 | Schwartz et al. | 382/104 |
| 2002/0159622 A1 * | 10/2002 | Schneider et al. | 382/128 |
| 2004/0042638 A1 * | 3/2004 | Iwano | 382/104 |
| 2004/0151356 A1 * | 8/2004 | Li et al. | 382/131 |
| 2006/0210116 A1 * | 9/2006 | Azuma | 382/104 |
| 2008/0109118 A1 * | 5/2008 | Schwartz et al. | 701/1 |
| 2010/0014713 A1 * | 1/2010 | Zhang et al. | 382/104 |
| 2010/0014714 A1 * | 1/2010 | Zhang et al. | 382/104 |

OTHER PUBLICATIONS

W. Kwon and S. Lee, "Performance Evaluation of Decision Making Strategies for an Embedded Lane Departure Warning System," Journal of Robotic Systems, 19 (10), pp. 499-509, 2002.
D. D. Salvucci, "Inferring Driver Intent: A Case Study in Lane-Change Detection," in Proceedings of the Human Factors Ergonomics Society 48th Annual Meeting, 2004.
J. C. McCall and Mohan Manubhai Trivedi, "Video-Based Lane Estimation and Tracking for Driver Assistance: Survey, Systems, and Evaluation". IEEE Transactions on Intelligent Transportation Systems, 7 (1), pp. 20-37, 2006.

* cited by examiner

*Primary Examiner* — Bhavesh Mehta
*Assistant Examiner* — Tahmina Ansari (57) ABSTRACT

A method is provided for detecting road lane markers using a light-based sensing device. Reflectivity data is captured using the light-based sensing device. A light intensity signal is generated based on the captured reflectivity data. The light intensity signal is convolved with a differential filter for generating a filter response that identifies a candidate lane marker region and ground segment regions juxtaposed on each side of the candidate lane marker region. A weighted standard deviation of the data points within the identified candidate lane marker region and weighted standard deviation of the data points within the ground segment regions are calculated. An objective value is determined as a function of the respective weighted standard deviations. The objective value is compared to a respective threshold for determining whether the identified candidate lane marker region is a lane marker.

19 Claims, 5 Drawing Sheets

DIFFERENTIAL FILTER

ROAD LANE MARKERS

ROAD-LANE MARKER DETECTION USING LIGHT-BASED SENSING TECHNOLOGY

BACKGROUND OF INVENTION

An embodiment relates generally to lane marker detection of a vehicle road using light-based sensing technology.

Lane marker detection is used either to alert a vehicle driver of the presence of road lane markers in the vehicle driving path, or to provide the feasible driving area constraint for route planning in autonomous driving. The issue is that most systems utilize a vision-based system such as a camera to analyze the captured image. Such vision-based systems are susceptible to incorrectly distinguishing lane markers due to the lighting conditions, shadows from trees and buildings, or poorly painted or warn lane markers. Furthermore, vision based systems are typically challenged by certain situations such sharp curves in the road.

SUMMARY OF INVENTION

An advantage of the invention provides for fast processing speeds and reliable detection performance for the lane marker in the captured LIDAR reflectivity data. The method first selects candidate regions for lane marker segments based on the reflectivity properties of the lane marker and adjacent areas. The data is then filtered and examined to determine the presence and location of the lane markers.

An embodiment contemplates a method of detecting road lane markers using a light-based sensing technology. Reflectivity data is captured using the light-based sensing device. A light intensity signal is generated based on the captured reflectivity data received by the light-based sensing device. The light intensity signal is convolved with a differential filter for generating a filter response that identifies a candidate lane marker region and ground segment regions juxtaposed on each side of the candidate lane marker region. A weighted standard deviation of data points within the identified candidate lane marker region is calculated. A weighted standard deviation of data points within the ground segment regions juxtaposed to the candidate lane marker region is calculated. An objective value is determined for the identified candidate lane marker region as a function of the weighted standard deviation of data points within the candidate lane marker region, the weighted standard deviation of data points within the ground segment regions juxtaposed to the identified candidate lane marker region, and a number of data points contained within the identified candidate lane marker region. The objective value is compared to a respective threshold for determining whether the identified candidate lane marker region is a lane marker.

An advantage of an embodiment provides for a lane marker detection system. The system includes a light-based sensing device for capturing road input data. A processor receives the captured road input data received by the light-based sensing device. The processor generates a light intensity signal based on the captured reflectivity data. The processor convolves the light intensity signal with a filter for generating a filter response for identifying a candidate lane marker region and adjacent ground segment regions. The processor determines a weighted standard deviation of data points within the identified candidate lane marker region and a weighted standard deviation of data points within the adjacent ground segments. The processor calculates an objective value for the identified candidate lane marker region as a function of the respective weighted standard deviations and a number of data points within the identified candidate lane marker region. The processor compares the objective value to a threshold for determining whether the identified candidate lane marker region is a lane marker. An output device identifies a location of the lane markers.

DETAILED DESCRIPTION

Figure 1:
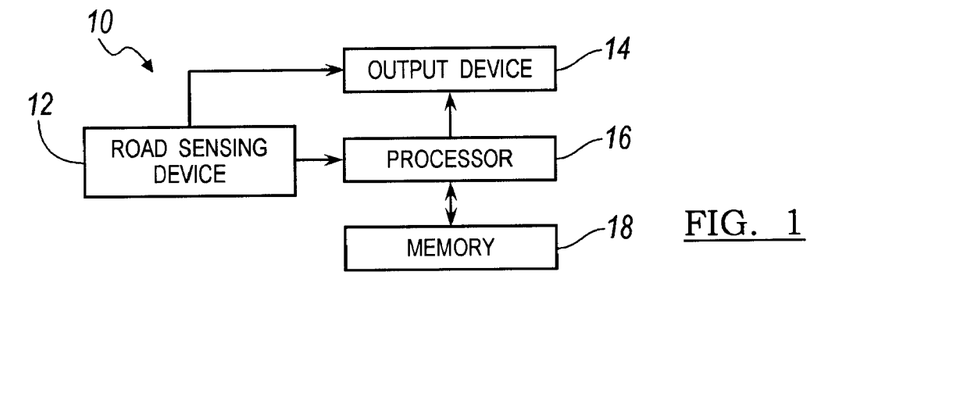
FIG. 1 is a schematic view of a light intensity lane marker detection system.

There is shown in FIG. 1 a light-based sensing system 10 for detecting lane markers in a vehicle road. The light-based sensing system 10 is used to detect road lane markers in the road of the driven vehicle. The light-based sensing system 10 is used in an autonomous steering system for road lane marker detection. Alternatively, the light-based sensing system 10 may be used for driver awareness for a vehicle driven by a driver to enhance visibility during the daytime or nighttime when road lane marker visibility is poor or during other instances when visibility enhancement is warranted.

The light-based sensing system 10 includes a road sensing device 12 including, but not limited to, a Light Detection and Ranging (LIDAR) sensing device or a camera. The LIDAR device measures the properties of scattered light to determine certain characteristics such as reflectivity values for differentiating road lane markings from ground segments (i.e., non-lane markings).

The light-based sensing system 10 further includes a processor 16 for receiving and processing the data captured by the road sensing device 12. A memory storage device 18 may also be provided for storing and retrieving the captured data.

The processor 16 executes a program that filters the captured data for determining the presence and location of one or more lane markers. The detected lane markers are provided to an output device 14 such as an autonomous steering module or an image display device. The autonomous steering module may use the processed information for autonomously maintaining vehicle position within a road. The image display device which may include, but is not limited to, monitor-type displays, a projection-type imaging, holograph-type imaging, or similar imaging displays may use the processed information for highlighting the road-lane marker in the image display device for providing visual enhancement of the road to the driver of the vehicle. The term highlighting refers to identifying the location of the road-lane markers in the image data and may be performed by any comparable method for identifying the location of the road-lane markers in the image data.

Figure 2:
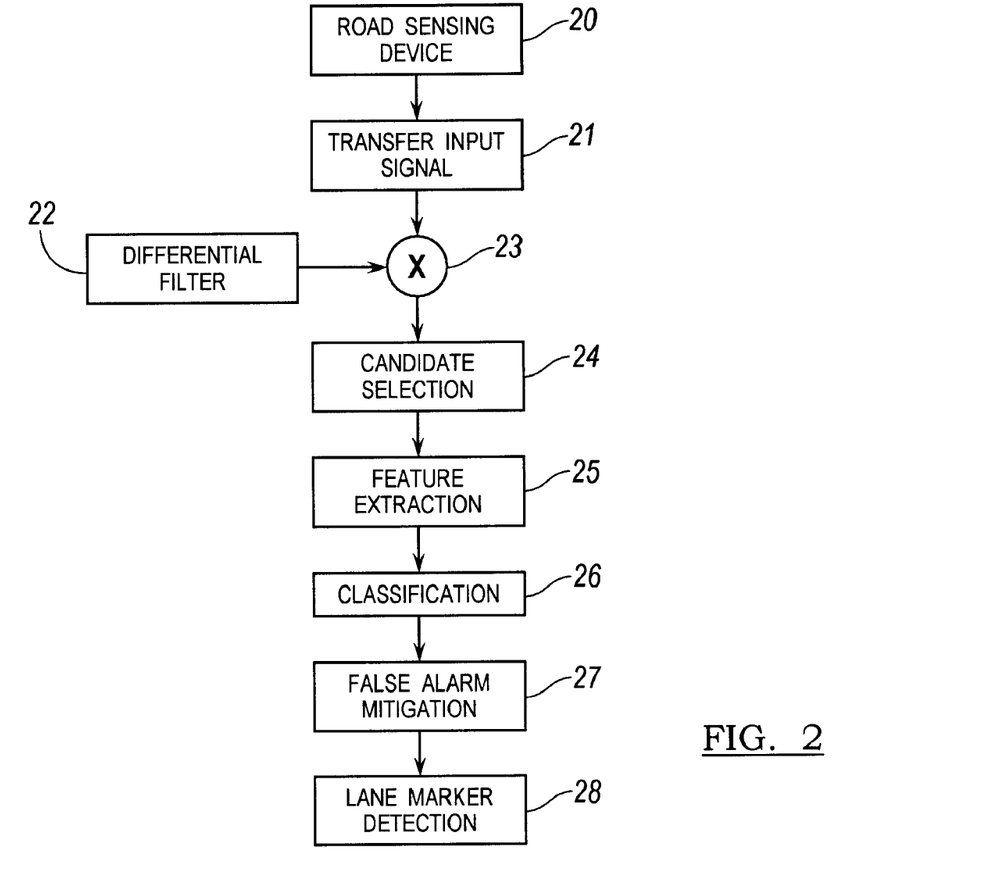
FIG. 2 is a block diagram of a method for detecting a lane marker in a road.

FIG. 2 illustrates a block diagram for detecting lane markers from the captured data. The light-based sensing system 10 is based on a light sensing technology including, but not limited to, LIDAR optical sensing technology that uses light to determine the illumination intensity of the objects in the captured data. The detection system uses a cascading processing method that includes (1) a candidate selection step, (2) a feature extraction step, (3) a classification step, (4) and false alarm mitigation step.

Figure 3:
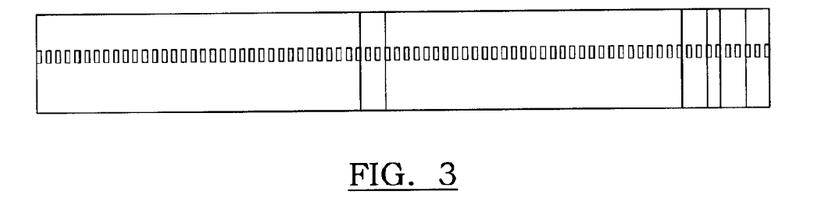
FIG. 3 is a one dimensional point array of the captured road data.
Figure 4:
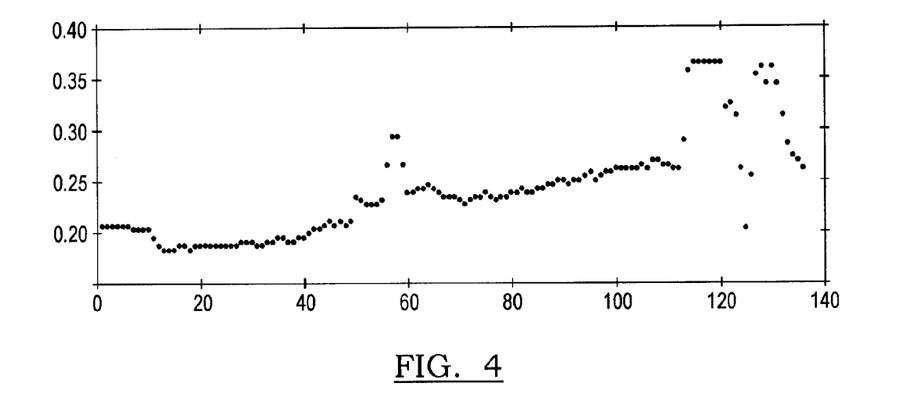
FIG. 4 is a light intensity signal of the captured input signal in one dimensional space.

In block 20, a LIDAR optical sensing device scans a candidate road segment exterior of the vehicle with a one-dimensional point array as illustrated in FIG. 3. The LIDAR optical sensing device selects a scan line and analyzes the intensity of the road segment region along the scan line. The LIDAR sensing device outputs a light-based intensity signal as a one dimensional elevation plot as illustrated in FIG. 4.

In block 21, the LIDAR illumination-based intensity signal is provided to the processing unit for processing and detecting lane markers in the road. It is understood that the term lane markers relate to markings or other identifiers which signify a designated area that a respective vehicle should maintain when being driven along the road.

The processor applies a lane marker detection algorithm that analyzes the illumination intensity of the captured data. The term illumination intensity refers not only to the illumination properties, but the intensity may include other properties such as the reflective properties, radiating properties, dullness, or other light-based properties that allows a distinction between a road surface and a lane marker.

Figure 5:
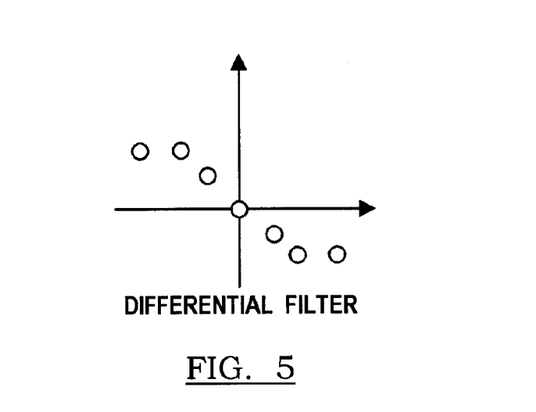
FIG. 5 is a differential filter applied to the light intensity signal.
Figure 6:
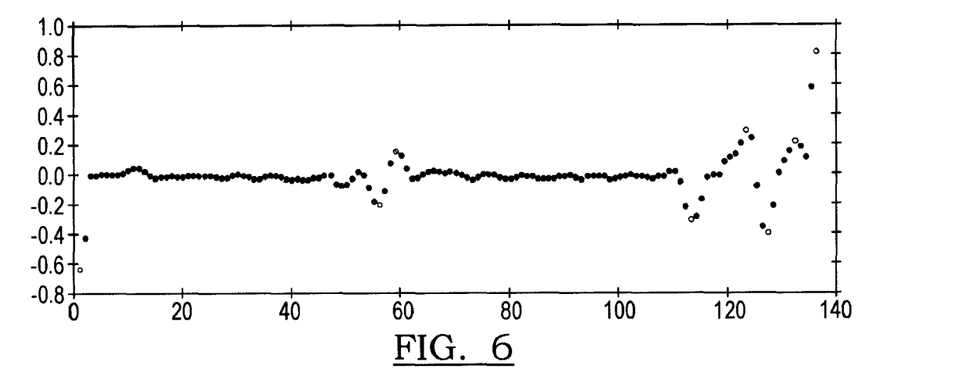
FIG. 6 is a plot of a filter response of the light intensity signal.

In block 22, a differential filter, shown in FIG. 5, is used to transform the light intensity signal to a filter response signal for distinguishing between the lane marker regions and the ground segment regions. The differential filter may include, but is not limited to, a Gaussian differential filter that is used to identify positive peaks and negative peaks which are representative of candidate lane marker regions. In block 23, the differential filter is convolved with the light intensity signal via the multiplier for outputting the filter response signal. An example of the filter response signal is shown in FIG. 6.

In block 24, the filter response is generated for identifying a candidate lane marker region. The filter response includes a plurality of substantially horizontal data points (e.g., non-lane marker regions) and a plurality downward shifting and upward shifting data points (e.g., boundaries of candidate lane marker regions).

Figure 7:
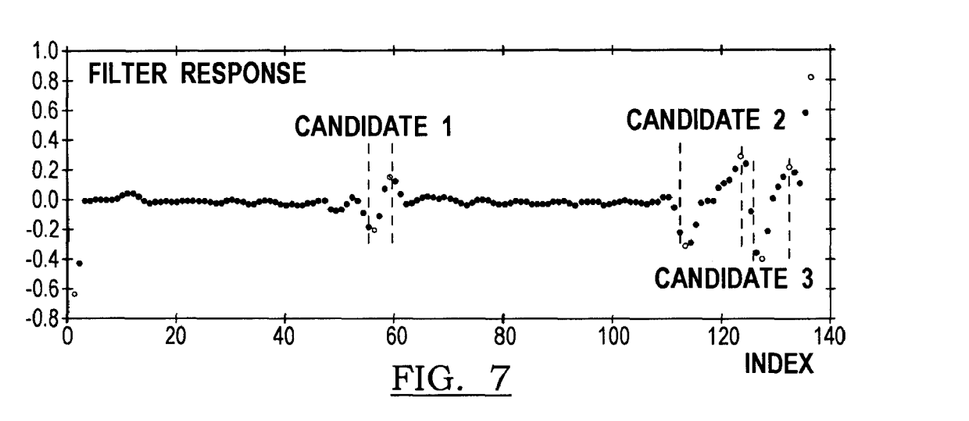
FIG. 7 is a plot of the candidate lane marker regions in the filter response.

FIG. 7 illustrates three candidate lane marker regions in the filter response. A first candidate lane marker region is represented by a region between a respective negative peak and a respective positive negative peak. An abrupt downward shifting data points and an abrupt upward shifting of the data points in the filtered response identifies the first candidate lane marker region in comparison to the substantially horizontal data points juxtaposed to the first candidate lane marker region. Similarly, a second candidate lane marker region and a third candidate lane marker region are represented by respective regions between additional respective negative peaks and positive peaks in the filter response. It is required that a peak response magnitude of these respective responses be higher than a predetermined peak threshold to distinguish from any noise. Each of the respective regions between the respective negative peaks and respective positive peaks are candidates for a lane marker as illustrated in FIG. 7.

In block 25, a feature extraction is applied to each of the candidate lane marker regions. The variance between the candidate lane marker regions and the ground segment regions are the features to be extracted. To extract the lane marker features, a first weighted standard deviation is determined based on data points within a respective candidate lane marker region and a second weighted standard deviation is determined based on data points within the ground segment regions juxtaposed to the respective candidate lane marker region. A formula for determining the weighted standard deviation of a respective lane marker is represented by:

$$\sigma_{(L)} = \sqrt{\frac{\sum_{i=1}^{N} w_i (x_i - \bar{x})^2}{\frac{(N-1)\sum_{i=1}^{N} w_i}{N}}}$$

where $\sigma_{(L)}$ is the lane marker weighted standard deviation, $w_i$ is a determined weight, $x_i$ is a respective value of a set of values within the candidate lane marker region, $\bar{x}$ is a mean of all the values $x_i$ in the set of values, and N is the number of values within the candidate lane marker region. The determined weight for weighting the standard deviation $w_i$ is determined by using the following formula:

$$w(i) = \begin{cases} \{2*\arcsin(i*\pi/(N-1), 2*\arcsin(i*\pi/(N-1)) \le 1\}, \\ \{1, \text{otherwise}\} \end{cases}$$

$$i = 0, 1, 2, \ldots, N-1,$$

where N is the number of data points in a respective candidate lane marker region.

A formula for determining the weighted standard deviation of the data points for a respective ground segment region is represented by:

$$\sigma_{(G)} = \sqrt{\frac{\sum_{i=1}^{N} w_i (x_i - \bar{x})^2}{\frac{(N-1)\sum_{i=1}^{N} w_i}{N_G}}}$$

where $\sigma_{(G)}$ is the ground segment weighted standard deviation, $w_i$ is a determined weight for the ground segment region, $x_i$ is a respective value of a set of values within the ground segment region, $\bar{x}$ is a mean of all the values $x_i$ in the set of values, and $N_G$ is the number of values within the ground segment regions.

To select the data points to be used for the ground segment regions, we cascade N/2 neighboring data points on the left of the candidate lane marker region and N/2 neighboring data points on the right of the candidate lane marker region. The determined weight $w_i$ is the same as the determined weight used for the candidate lane marker region.

In block 26, a classifier is provided for selecting balancing parameters that are used to provide a balance between the respective standard deviations. The classifier may be any classifier including, but is not limited to, a support vector machine or a neural network training program. Balancing parameters selected by a trained classifier provide a balance between the weighted standard deviation of the candidate lane marker region $\sigma_{(L)}$, weighted standard deviation of the ground segment region $\sigma_{(G)}$, and the number of data points within the candidate lane marker region N. The balancing parameters are used to calculate an objective value f which is used to determine whether the candidate lane marker region is a lane marker. The formula for determining the objective value f is represented by the following formula:

$$f=\alpha*\sigma_L+\beta*\sigma_G+\gamma/(N*N)$$

where $\sigma_L$ is the weighted standard deviation of the data points within the identified candidate lane marker region, $\alpha$ is a balancing parameter applied to the weighted standard deviation of the identified candidate lane marker region, $\sigma_G$ is the weighted standard deviation of the data points within the ground segment regions, $\beta$ is a balancing parameter applied to the weighted standard deviation of the ground segment regions, $N_L$ is the number of data points within the identified candidate lane marker region, and $\gamma$ is a balancing parameter applied to the number of data points within the identified candidate lane marker region.

The determined objective value f is compared to a predetermined threshold value for determining whether the candidate lane marker region is a lane marker. If the objective value is smaller than the predetermined threshold, then the determination is made that the candidate lane marker region is a lane marker. If the objective value is larger than the predetermined threshold, then the candidate lane marker region is considered not to be the lane marker.

In block 27, a false alarm mitigation test is applied for verifying that the candidate lane marker region is the lane marker. The width of the lane marker is determined between the negative peak and the positive peak and is represented by a distance (d). The distance (d) is compared to a predetermined distance. The predetermined distance is a maximum width that a lane marker may be in order to be considered a lane marker. If the distance (d) is less than the predetermined distance, then the candidate lane marker region is considered to be a lane marker. If the distance (d) is greater than the predetermined distance, then the candidate lane marker region is considered not to be the lane marker.

Figure 8:
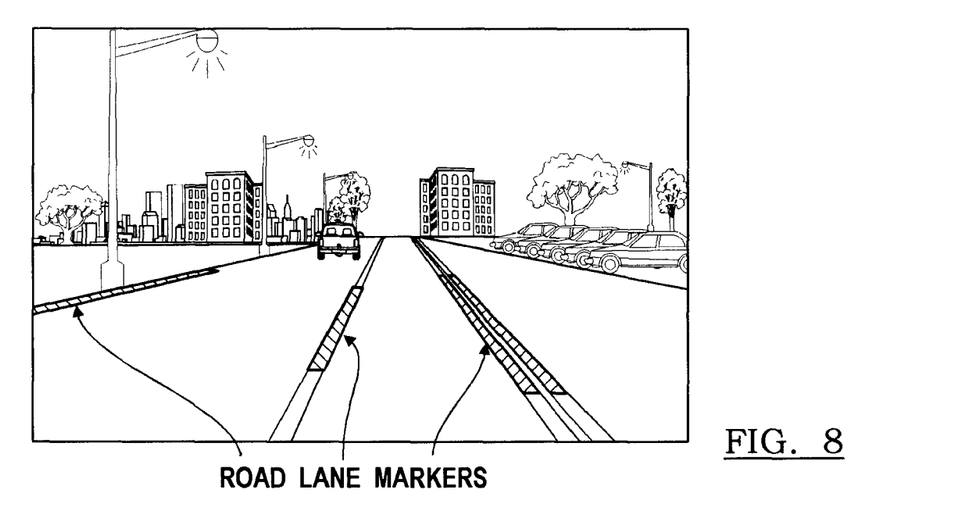
FIG. 8 is a display of highlighted lane markers in the captured image.

In block 28, lane marker detection is applied to the output device. (as illustrated in FIG. 8). The output device as described earlier may include, but is not limited to, the autonomous steering module or the imaging display device. The autonomous steering module uses the detected road-lane markers for autonomously maintaining the vehicle between lane markers. The imaging display device highlights the detected lane markers for visually enhancing the driven vehicle lane to the driver of the vehicle as shown in FIG. 8. As stated earlier, highlighting refers to identifying the location of either the lane markers in the image data and may be performed by any comparable method for showing the location of the lane markers in the image data.

Figure 9:
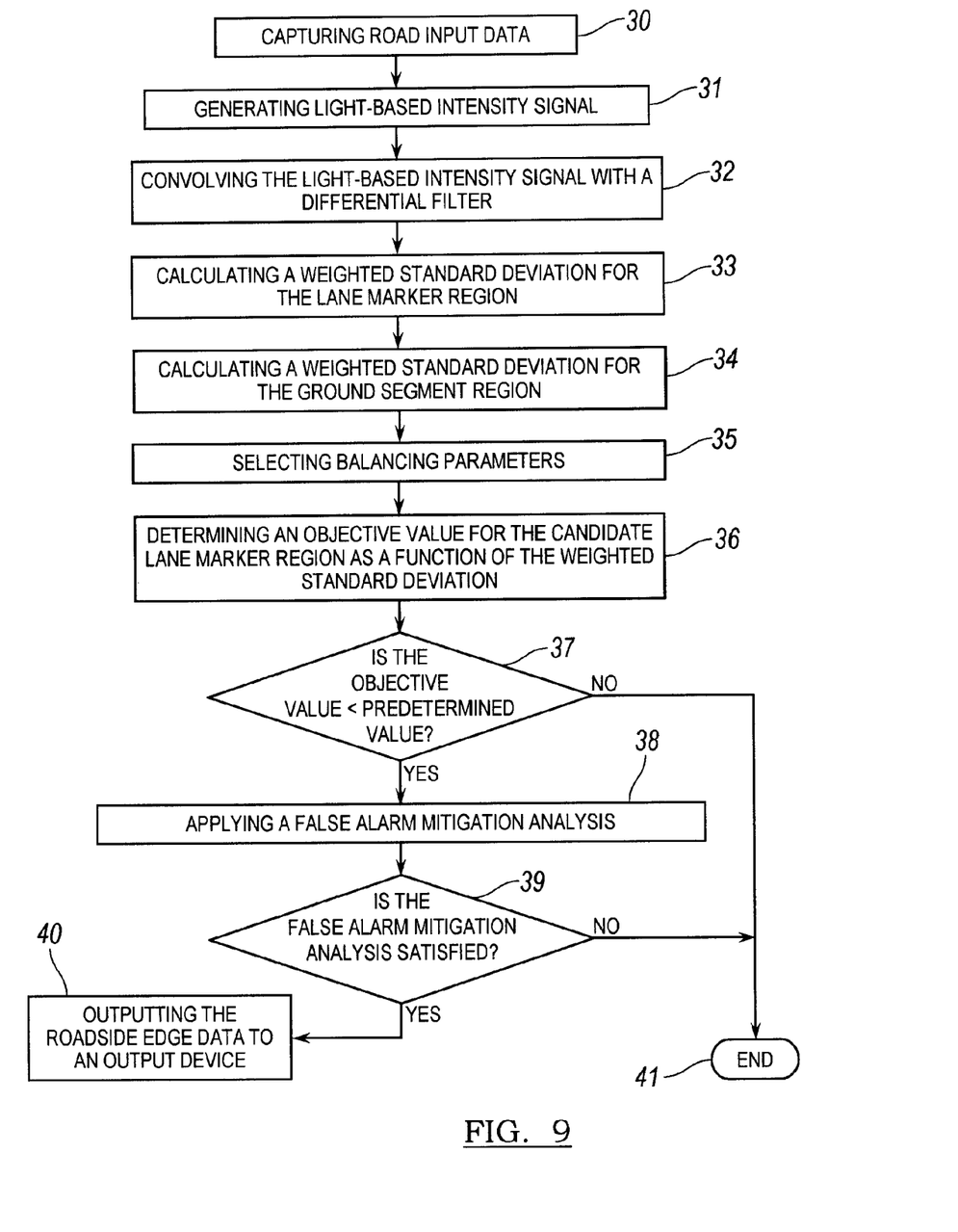
FIG. 9 is a flowchart of a method for detecting lane marker in the road.

FIG. 9 is a flowchart of a method for detecting a lane marker. In step 30, road input data is captured by a road sensing device that includes, but is not limited to, the LIDAR-based sensing device. In step 31, the light-based intensity signal is generated in response to the captured input road data.

In step 32, the illumination-based intensity signal is convolved with a differential filter for generating a filter response signal. The filter response signal enhances respective candidate lane marker regions.

In step 33, a weighted standard deviation is determined for the candidate lane marker region. In step 34, a weighted standard deviation is determined for the ground segment regions juxtaposed to the lane markers. In step, 35, respective balancing parameters are selected for providing a balance between the standard deviation of the candidate lane marker region, the ground segment region, and the number of data points (N) in the candidate lane marker region.

In step 36, an objective value is determined for the candidate lane marker region as a function of the respective weighted standard deviations, the respective balancing parameters applied to the respective weighted standard deviations, the number of data points within the candidate lane marker region, and the respective balancing parameter applied to the number of data points.

In step 37, the objective value is compared to a predetermined threshold. If the objective value is not less than the predetermined threshold, then the determination is made that the candidate lane marker region is not a lane marker and the routine is terminated in step 41. If the determination is made that the objective value is less than the predetermined threshold, then the determination is made that the candidate lane marker region may be a lane marker and the routine proceeds to step 38.

In step 38, a false alarm mitigation analysis is performed for verifying whether the candidate lane marker region is a lane marker. In step 39, a comparison is made for determining whether the false alarm mitigation analysis correctly indicates that the candidate lane marker region is a lane marker. If the comparison indicates that the candidate lane marker region was incorrectly identified as a lane marker, then the routine proceeds to step 41 where the routine is terminated.

In step 39, if the comparison indicates that the candidate lane marker region was correctly identified as a lane marker, then the routine proceeds to step 40 where the lane markers of the road are provided to an output device. The output device may include, but is not limited to, an autonomous steering module for autonomously steering the vehicle within the lane markers or an image display device for visually enhancing the location of the lane markers to the driver of the vehicle.

Figure 10:
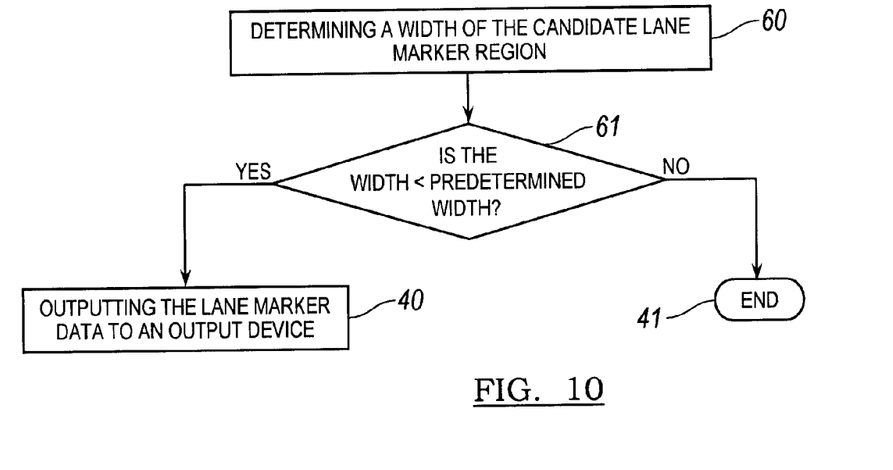
FIG. 10 is a flowchart of a method for a false alarm mitigation analysis according to a first embodiment.

FIG. 10 illustrates an embodiment of a method of a false alarm mitigation analysis performed for determining whether the candidate lane marker region correctly was identified as the lane marker.

In step 50, a width of the lane based candidate region is determined. In step 51, the comparison is performed. In step 51, the determined width is compared to a predetermined distance threshold. If the width is greater than the predetermined distance threshold, then the routine proceeds to step 41 where the routine is terminated. If the width is less than the predetermined distance, then the routine proceeds to step 40.

In step 40, lane markers of the road are highlighted in the image display device for visually enhancing the location of the lane marker to the driver of the vehicle. Alternatively, the location of the lane markers may be provided to an autonomous steering module for autonomously maintaining the vehicle between the lane markers.

Figure 11:
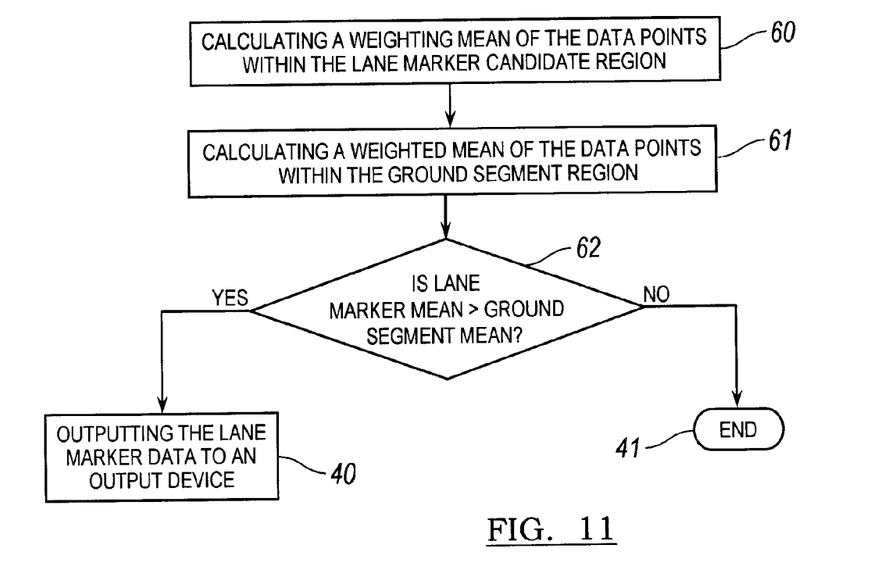
FIG. 11 is a flowchart of a method for a false alarm mitigation analysis according to a second embodiment.

FIG. 11 illustrates an embodiment of a method of a false alarm mitigation analysis performed for determining whether the candidate lane marker region was correctly identified as the lane marker. The embodiment as shown in FIG. 10 may be a second false alarm mitigation analysis that is performed in addition to the analysis shown in FIG. 9, or may be performed as an alternative analysis to the analysis shown in FIG. 9.

In step 60, a weighting mean of data points of the candidate lane marker region is calculated. In step 61, a weighting mean of a data points the ground segment region is calculated.

In step 62, a comparison is made as to whether the weighting mean of the lane marker is greater than the weighting mean of the ground segment region. If mean of the lane marker is less than the mean of the ground segment region, then the routine proceeds to step 41 where the routine is terminated. If the mean of the lane marker region is greater than the mean of the ground segment region, then the routine proceeds to step 40.

In step 40, lane markers of the road are highlighted in the image display device of visually enhancing the location of the lane marker to the driver of the vehicle. Alternatively, the location of the lane markers may be provided to an autonomous steering module for autonomously maintaining the vehicle between the lane markers.

While certain embodiments of the present invention have been described in detail, those familiar with the art to which this invention relates will recognize various alternative designs and embodiments for practicing the invention as defined by the following claims.

What is claimed is:

1. A method of detecting road lane markers using a light-based sensing technology, the method comprising the steps of:
   capturing reflectivity data using a light-based sensing device;
   generating a light intensity signal based on the captured reflectivity data received by the light-based sensing device;
   convolving the light intensity signal with a differential filter for generating a filter response that identifies a candidate lane marker region and ground segment regions juxtaposed on each side of the candidate lane marker region;
   calculating a weighted standard deviation of light intensity-based data points within the identified candidate lane marker region;
   calculating a standard deviation of light intensity-based data points within the ground segment regions juxtaposed to the candidate lane marker region;
   determining an objective value for the identified candidate lane marker region as a function of the weighted standard deviation of light intensity-based data points within the candidate lane marker region, the weighted standard deviation of light intensity-based data points within the ground segment regions juxtaposed to the identified candidate lane marker region, and a number of data points contained within the identified candidate lane marker region; and
   comparing the objective value to a respective threshold for determining whether the identified candidate lane marker region is a lane marker.

2. The method of claim 1 further comprising the step of applying a false alarm mitigation analysis for verifying whether the identified candidate lane marker region is a lane marker.

3. The method of claim 2 wherein the false alarm mitigation analysis further comprises the steps of:
   determining a width of the identified candidate lane marker region;
   comparing the width to a predetermined width; and
   determining that the identified candidate lane marker region is the lane marker in response to the width being less than the predetermined width, otherwise determining that the identified candidate lane marker region is not the lane marker.

4. The method of claim 2 wherein the false alarm mitigation analysis further comprises the steps of:
   calculating a weighted mean of the light intensity-based data points within the identified candidate lane marker region;
   calculating a weighted mean of the light intensity-based data points within the ground segment regions;
   comparing the weighting mean of the identified candidate lane marker region to the weighted mean of the ground segment regions; and
   determining that the identified candidate lane marker region is the lane marker in response to the weighting mean of the identified candidate lane marker region being greater than the weighted mean of the ground segment regions.

5. The method of claim 1 wherein a first edge of the identified candidate lane marker region is identified by a negative peak in the filter response and a second response is identified by a positive peak in the filter response.

6. The method of claim 5 wherein the negative peak is identified at an abrupt shifting downward of data points in the filtered response in comparison to substantially horizontal adjacent data points of the ground segment regions.

7. The method of claim 4 wherein the positive peak is identified at an abrupt shifting upward of data points in the filtered response in comparison to substantially horizontal adjacent data points of the ground segment regions.

8. The method of claim 1 wherein a determined weight applied for determining the weighted standard deviation is represented by the equation:

$$w(i) = \begin{cases} 2*\arcsin(i*\pi/(N_L-1)), & 2*\arcsin(i*\pi/(N_L-1)) \leq 1 \\ 1, & \text{otherwise} \end{cases}$$

$$i = 0, 1, 2, \ldots, N_L - 1,$$

where $N_L$ is the number of data points within the identified candidate lane marker region.

9. The method of claim 1 wherein the step of determining a weighted standard deviation of the light intensity-based data points within the ground segment regions include calculating a weighted standard deviation of the light intensity ground segment regions.

10. The method of claim 1 wherein a determined weight applied for determining the weighted standard deviation is represented by the equation:

$$w(i) = \begin{cases} 2*\arcsin(i*\pi/(N_G-1)), & 2*\arcsin(i*\pi/(N_G-1)) \leq 1 \\ 1, & \text{otherwise} \end{cases}$$

$$i = 0, 1, 2, \ldots, N_G - 1,$$

where $N_G$ is the number of data points within the identified ground segment region juxtaposed on both sides of the identified candidate lane marker region.

11. The method of claim 1 wherein determining the objective value (f) is derived from the following formula:

$$f = \alpha*\sigma_L + \beta*\sigma_G + \gamma/(N*N)$$

where $\sigma_L$ is the weighted standard deviation of the light intensity-based data points within the identified candidate lane marker region, $\alpha$ is a balancing parameter applied to the weighted standard deviation of the identified candidate lane marker region, $\sigma_G$ is the weighted standard deviation of the light intensity-based data points within the ground segment regions, $\beta$ is a balancing parameter applied to the weighted standard deviation of the ground segment regions, $N_L$ is the number of data points within the identified candidate lane marker region, and $\gamma$ is a balancing parameter applied to the number of data points within the identified candidate lane marker region.

12. The method of claim 11 wherein the respective balancing parameters are determined by a classifier.

13. The method of claim 11 wherein the respective balancing parameters are determined by a support vector machine classifier.

14. The method of claim 11 wherein the respective balancing parameters are determined by a neural network-base training program.

15. The method of claim 11 wherein the respective balancing parameters are selected to provide a balance between each of weighted standard deviation of the identified candidate lane marker region, the standard deviation of the ground segment regions, and the number of data points contained in the identified candidate lane marker region.

16. A lane marker detection system comprising:
a light-based sensing device for capturing reflectivity data;
a processor for receiving the captured reflectivity data received by the light-based sensing system, the processor generating a light intensity signal based on the captured reflectivity data, the processor convolving the light intensity signal with a filter for generating a filter response for identifying a candidate lane marker region and adjacent ground segment regions, the processor determining a weighted standard deviation of light intensity-based data points within the candidate lane marker region and a weighted standard deviation of light intensity-based data points within the adjacent ground segments, the processor calculating an objective value for the identified candidate lane marker region as a function of the respective weighted standard deviations and a number of data points within the identified candidate lane marker region, the processor comparing the objective value to a threshold for determining whether the candidate lane marker region is a lane marker; and
an output device identifying a location of each of the lane markers.

17. The lane marker detection system of claim 16 further comprising a false alarm mitigation module for verifying whether the identified candidate lane marker region is the lane marker.

18. The lane marker detection system of claim 16 further comprising a classifier for generating the weighting parameters.

19. The lane marker detection system of claim 16 wherein the classifier is a support vector machine classifier.

* * * * *